(12) United States Patent
Reichow et al.

(10) Patent No.: US 9,445,065 B1
(45) Date of Patent: Sep. 13, 2016

(54) MULTIPLE LIGHT SYSTEM BLENDING

(71) Applicant: DISNEY ENTERPRISES, INC., Burbank, CA (US)

(72) Inventors: Mark A. Reichow, Glendale, CA (US); Jacob David Lessor, North Hills, CA (US); Sandi S. Sullivan, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 14/824,677

(22) Filed: Aug. 12, 2015

(51) Int. Cl.
*H04N 9/31* (2006.01)
*G06T 15/50* (2011.01)
*G06T 13/20* (2011.01)

(52) U.S. Cl.
CPC ............ *H04N 9/3179* (2013.01); *G06T 13/20* (2013.01); *G06T 15/503* (2013.01); *H04N 9/3164* (2013.01)

(58) Field of Classification Search
CPC .... H04N 9/31; H04N 9/3179; H04N 9/3164; H04N 13/04; H04N 13/0459; G06T 15/503; G06T 13/20
USPC ................ 348/744, 750, 51, 771, 578, 586, 348/597–599; 353/122, 94, 84
See application file for complete search history.

(56) References Cited

U.S. PATENT DOCUMENTS

| | | | |
|---|---|---|---|
| 7,213,923 B2* | 5/2007 | Liu ................... | G03B 21/56 353/31 |
| 7,494,230 B2* | 2/2009 | May ................. | H04N 5/7458 348/771 |
| 7,914,154 B2* | 3/2011 | Obi .................. | G03B 21/56 353/79 |
| 8,810,739 B2* | 8/2014 | Terao ............... | G03B 21/006 349/5 |
| 9,019,584 B2* | 4/2015 | Yamaichi .......... | C23C 14/06 359/9 |
| 9,132,361 B2* | 9/2015 | Smithwick ........ | G02B 21/00 |
| 2005/0088737 A1* | 4/2005 | Piehl ................. | G03B 21/56 359/443 |

* cited by examiner

*Primary Examiner* — Trang U Tran
(74) *Attorney, Agent, or Firm* — Marsh Fischmann & Breyfogle LLP; Kent A. Lembke

(57) ABSTRACT

A display system for blending two (or more) light systems. The system includes an object with an outer surface. The display system includes a light source projecting ultraviolet (UV) light onto the outer surface and a light source projecting (concurrently in many applications) content onto the outer surface with visible light. Further, the display system includes a light-blending element on the outer surface for concurrently receiving the UV light and the visible light. The light-blending element includes a background layer reflecting the visible light and a foreground layer covering at least a portion of the background layer and producing light in response to the receiving of the UV light. The foreground layer includes black light paint that fluoresces to produce the light in response to the UV light. The background layer includes a layer of material that is non-fluorescent in response to the UV light such a non-fluorescent white paint.

5 Claims, 5 Drawing Sheets

MULTIPLE LIGHT SYSTEM BLENDING

BACKGROUND

1. Field of the Description

The present description relates, in general, to light-based displays for providing unique visual effects to viewers or observers of the displays (herein, "display" is used in a broad sense to include multiple surfaces and objects upon which light is projected or directed from one or more light sources and is not used to describe a more limited display element such as a computer or television monitor), and, more particularly, to display systems (and methods) adapted to blend multiple (e.g., two or more) types of light on light-blending surfaces of display objects, such as set or scene props, elements, or features, to create a visually appealing display. For example, a display system may be provided that is adapted to uniquely blend white light and black light to achieve desired imagery in a set along a path of an amusement or theme park ride.

2. Relevant Background.

There are many settings where it is desirable to provide viewers with a variety of visual imagery to entertain and excite the viewers. For example, theme and amusement park operators often will design spaces along ride paths and other park spaces to include interesting visual displays that may be themed to correspond with the ride or nearby park exhibits. Often, it is desirable to provide "eye-popping" or dramatic displays that leave the viewers wondering how the visual effect was achieved.

Some unique displays are created by using a combination of white or visible light and black or ultraviolet (UV) light to illuminate a scene. Combining these two types of light, though, can be challenging. One problem is how to successfully blending projected dynamic media (e.g., color animation or movies), which is provided with visible or white light, into a black light scene, which is visible due to use of black or UV light. This is problematic because there are often color and design restraints that create a complicated work flow (e.g., equating to more time being required by the media designer) and that create large creative limitations that constrain what types of visual effects can be achieved.

For many display designers, the use of projected media is one of the most useful tools available for creating illusions and interesting displays and themed environments. For example, inserting projected media (e.g., animation and movies onto nearby surfaces and objects) into traditional dark rides at an amusement park can result in amazing and surprising results. However, problems with blending white light media with existing black light sets or environments has limited and constrained many uses of white light media within black light sets (e.g., painted, printed, or themed sets that are typically designed to provide a static pattern, which is the surface pattern that must be balanced/overcome when light such as video imagery is projected upon the set surfaces). As one example, white light can easily overcome or overwhelm imagery achieved using black light such that to "blend" the two lights there has to be significant effort to map projection of media within the black light set to avoid simply losing all or most of the black light effects.

When projecting media using white light (i.e., visible light) in a typical projection environment, it is generally desirable to have a screen surface that reflects all of the visible spectrum color back to the viewer's eyes with as much richness, brightness, and contrast as possible to create a high quality image. In a theater setting, for example, a member of the audience is in a fixed location with a fixed point of view (POV), and the theater designers and operators can control visible ambient light levels and design the screen surface (and its material(s)) to perform as desired to produce a particular image quality. The formulas and design rules governing the theater environment are relatively straightforward to follow and implement as most design variable all exist within a single bandwidth of light.

In contrast, the formulas and design rules differ drastically for a black light scene. While white light is reflected to a viewer, black light acts to excite materials of surfaces painted with black light or UV paint to cause these materials to emanate or produce light, which may be nearly any color, that is visible to the viewer. In many cases, a black light scene is fabricated by painting or printing a static media onto a surface. The surface may be prepped with an underlying base coat of fifty percent visible light or white paint and fifty percent UV light or white fluorescing paint. This is done to create a surface that, in addition to being excited by black or UV light, reflects all of the color back to the eye with as much richness, brightness, and contrast as possible to create a high quality image.

Such UV painting is useful for producing vibrantly color surfaces, but the patterns or surfaces are static unless the painted object itself moves within the black light scene. Video projection can be used within conventional black light scenes and can be mapped to the painted patterns so as to come close to the UV paint, but it must be aligned very carefully with adjacent projection surfaces (without UV paint) to avoid overwhelming the UV-excited patterns. Such alignment of the projector with projection surfaces is difficult to achieve and then maintain in many cases. For example, the black light scene may include objects with irregularly shaped and often small or narrow surfaces such as foliage, flowers, and so on, and the objects in the black light scene may move during the projection of the media such as in response to air movement (e.g., heating and ventilation may cause air to flow over and move set objects about over time). It can be very difficult to achieve proper mapping of the white light media projected onto such objects when they are all static and nearly impossible once the objects begin to move even a small amount.

There is a continuing desire to use multiple light types in a single or common scene. Often, a display designer will request that white light be used to project video or other media into a scene that includes UV paint that is excited by a UV or black light projector so as to obtain the unique character and quality of each of these types of light (or light systems). Combining UV static imagery and white light video projection would seem to provide the best of both worlds (or light systems), but these two light systems are incompatible in many ways.

Visible light projection benefits from a light background or projection surface (e.g., a white surface) that reflects light back to the viewer, and contrast is enhanced by use of sharp and, often, black edges. UV light systems are based on emission of fluorescent particles from materials excited by UV light, and, hence, black light scenes do not benefit from light being reflected from backgrounds such that black or UV painted objects typically look best (i.e., with highest contrast) with dark black and light-absorbing backgrounds. Due to the contrasting qualities of these two light systems, there remains a need for an improved system for blending UV and white light systems together or of generating a display concurrently using white light to project media and UV light to create UV-based imagery on nearby surfaces.

SUMMARY

Briefly, a display system and display method are described that are useful for blending light from a visible or white light projector (e.g., a projector projecting video or animation content) into a black light environment. With the new system and method, a display set can be designed with props or objects providing two dimensional (2D) and three dimensional (3D) projection surfaces (e.g., outer surfaces of the props or objects). On these projection surfaces, light-blending elements or surfaces are formed by first providing a layer or coating of non-fluorescing white paint (e.g., paint that is adapted to remain gray to black when exposed to black or ultraviolet (UV) light) and second providing a layer or coating of UV-reactant paint (or more simply, "UV paint" or "black light paint").

The layer of UV-reactant paint can be provided in a pattern to achieve a desired effect such as to define outer edges or boundaries of the prop/object surface, which eases concerns with aligning white light projected content as this can be mapped to the uncovered portions of the layer of the non-fluorescing white paint and allowed to spill over onto some of the UV-reactant paint layer. With the light-blending surfaces, one can more easily blend the effects of the two light systems with improved contrast including backgrounds that appear to truly black.

More particularly, a display system is provided that includes an object with an outer surface (e.g., a prop in a set or display environment of the display system such as may be provided along the path of a dark ride in an amusement park). The display system includes a first light source projecting ultraviolet (UV) light onto the outer surface and a second light source projecting (concurrently in many applications) content onto the outer surface with visible light. Further, the display system includes a light-blending element (or surface or layer stack or assembly) on the outer surface for concurrently receiving the UV light and the visible light. The light-blending element includes a background layer reflecting the visible light and a foreground layer covering at least a portion of the background layer and producing light in response to the receiving of the UV light.

In some embodiments, the foreground layer includes black light paint that fluoresces to produce the light in response to the receiving of the UV light. In these or other embodiments, the background layer includes a layer of material that is non-fluorescent in response to the receiving of the UV light. For example, the layer of material in the background layer may be a non-fluorescent white paint.

In some display system implementations, the content comprises video or animation media that is adapted to provide energy or movement to the outer surface of the object. To this end, the second light source projects the content onto the outer surface with mapping of the visible light onto areas of the background layer outside of the portion covered by the foreground layer. In some cases, the second light source projects the content onto the outer surface with additional mapping of the visible light onto one or more areas of the portion covered by the foreground layer.

In some embodiments, the portion covered by the foreground layer includes an outer edge of the outer surface of the object so as to ease alignment constraints of the projected media/content with the outer surface of the object (e.g., to limit blow by). A high quality black light fixture may be used for the first light source such that that the UV light includes little to no visible light. For example, the UV light may only include light with a peak wavelength of less than 380 nanometers (nm) (e.g., in the range of 100 to 370 nm or the like).

DETAILED DESCRIPTION OF THE PREFERRED EMBODIMENTS

Figure 1:
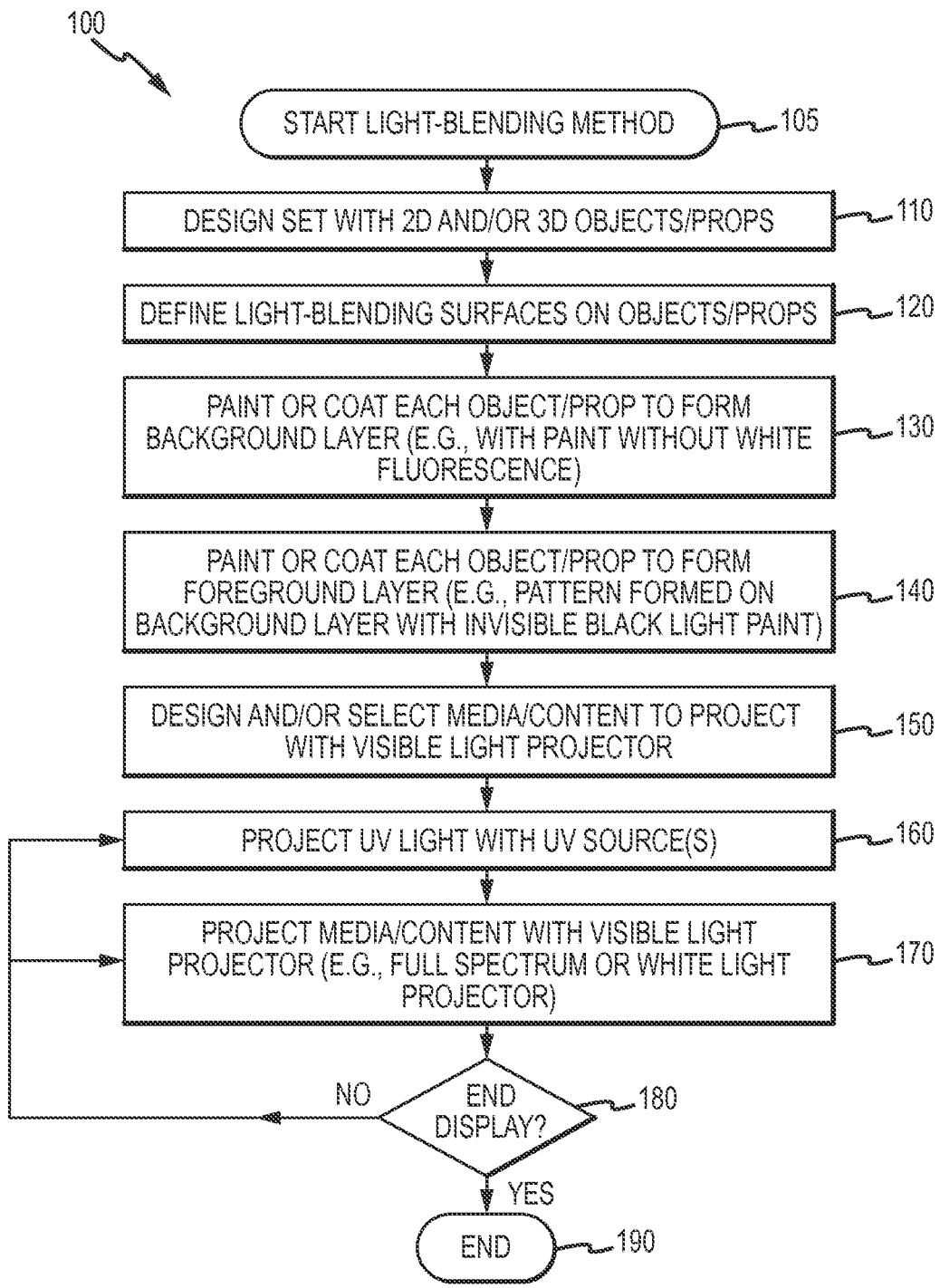
FIG. 1 is a flow chart showing steps of a method of blending light systems to provide a visual display or effect.

Briefly, the present description is directed toward display systems and methods that are adapted for blending multiple light systems. In particular exemplary display systems and methods taught herein, the use of white or visible light projection of media (e.g., video or still images or content) is blended or mixed with use of ultraviolet (UV) or black light projection to provide UV-based (or black light-based) imagery to create a unique and visually exciting display for a viewer. For example, a display system may be provided along the path of a dark ride in an amusement or theme park, and the display system may include a set for blending white projection and UV-light systems. The display system may include one or more white or visible light projectors and one or more UV or black light projectors, and, significantly, the set will include one to many props or objects (two or three dimensional (2D or 3D) props or objects) with light-blending surfaces. Stated differently, the set includes 2D and/or 3D props or objects that are specially adapted to be concurrently illuminated and/or excited using blended light in the form of a blend of UV and white light.

To provide the "light-blending surfaces," the inventor recognized that one solution would be to provide a background layer of material (e.g., paint or coating) that is a color or otherwise reflective to a broad spectrum of visible light while concurrently (or also) being absorbing or non-reflective to UV or black light. The material or composition of this background layer is chosen so as to be essentially white for the visible spectrum (or when illuminated with visible or white light) and to be black for the UV or black light spectrum. Conventional white-colored or painted background and background coatings, in contrast, are designed to reflect visible light as one would expect to optimize a visible light painting or print. Further, conventional paints and coating materials include brighteners that further improve the visible light performance (e.g., reflection), and these conventional materials also fluoresce when illuminated or exposed to UV or black light. Hence, these conventional paints or coating materials are unsuitable for the background layer of the "light-blending surfaces" of the inventor's display systems as they fail to provide a high contrast background for UV paints.

To address this issue, light-blending surfaces are formed using a background layer formed (e.g., painting, coating, printing, or the like) of a material from which the brighteners are removed or in which the brighteners are masked. Then, under UV illumination, the bluish fluorescence is eliminated from background layer or at least substantially reduced. To form a light-blending surface (e.g., on a set prop or object), a base coat is applied to each object's surface that will received visible light projection, and the material of this base coat (or background layer) may be a non-fluorescing visible spectrum, white-colored paint. Then, a top or foreground layer is provided over the background layer using UV or black light paint.

The inventor has shown through testing of prototypes that such paint gives a very high gain for media provided by a white light projector. Under UV or black light, the background layer appears to the observer's eye to be very dark (e.g., nearly black in many cases). This is likely because the material of the background layer absorbs the light from the UV or black light projector. In other embodiments, the background paint/coating can be treated with UV inhibitors in addition to or as an alternative to using a material with the fluorescent brighteners removed. As will be appreciated by those skilled in the display arts, the use of this unique background layer provides a significant step in blending light systems. Particularly, by controlling a specific amount of UV and white light on light-blending surface with this background layer, the perception of incredible amounts of contrast can be created with the display system.

The display systems may further make use of high quality or purer UV sources (e.g., black light fixtures providing no or little blue light to provide UV light such as with a peak wavelength of less than 380 nanometers (nm) or with a wavelength range of about 100 to 380 nm or the like). The combination of the use of such UV sources as the UV or black light projectors and the use of the background layer underneath the UV-paint foreground layer makes the background layer appear truly black in UV illumination while providing an effective wide spectrum reflector of visible light (from a white or visible light projector used to provide media content on the light-blending surfaces in the display system).

The method further may include display design steps to achieve a desired visual effect. The method may include separating the portions of the artwork or displayed content that the designer wishes to be dynamic from the portions that are to be static. The static portions may be presented using the foreground layer of light-blending surfaces of set objects/props and then exciting these portions of the light-blending surfaces with black or UV light from a UV projector(s). The dynamic portions, in contrast, are provided by projecting visible light (e.g., video content or media) from a visible or white light projector onto all or portions of the light-blending surfaces. Due to the use of the background layer with its unique material properties, the projected media/content does not have to be mapped or aligned only with areas of the light-blending surfaces that do not include the UV paint (or to avoid the foreground layer of each light-blending surface) as the white light is blended more fully with the light emanating from the foreground layers (e.g., from the UV painted patterns) rather than washing it out or overwhelming it in the displayed imagery.

FIG. 1 illustrates a method 100 of blending two (or more) light systems to achieve a desired visual effect or display for a viewer (such as a person riding in a vehicle in a dark ride or the like). The method 100 starts at 105 such as with selecting a location for a display system of the present description, and step 105 may include defining a size and shape of a physical set. The method 100 then continues at 110 with designing the set of the display system, and this will involve designing or selecting 2D objects and/or 3D objects to place in the set and the location of such objects or props. The 2D and 3D objects are used to provide light-blending surfaces in the set on which black light-based imagery can be effectively blended with media or content from a white light projector. The 2D and 3D objects/props may take nearly any form, and the inventive light-blending surfaces eliminate the strict need for accurate aligning of projected light with surfaces that are not being used for black light effects such that the 2D and 3D objects/props may be relatively small and/or irregular in shape while still providing excellent display surfaces. For example, the 2D and 3D objects/props may include foliage, flowers, and the like that can move during display operations and still provide a desirable visual effect.

The method 100 continues at 120 with defining the light-blending surfaces on the various objects and props for step 110. This may involve determining which surfaces of the objects/props will be visible to viewers of the display and choosing whether all or a portion of these visible surfaces are to be used as light-blending surfaces (surfaces exposed to white and UV light during display system operations). Step 120 also will include determining where to provide the foreground layer on each of these light-blending surfaces, e.g., choosing what pattern will be displayed to a viewer using UV or black light on each object's light-blending surface or area. Further, step 120 may include selecting which colors to display in each of the light-blending surfaces with the foreground layer as UV paint or black light coatings/materials are available in a wide range of colors and any or all may be used to practice the presently described light-blending surfaces.

In step 130, the method 100 involves painting or coating each object/prop for the set so as to form a background layer for the light-blending surfaces. In some embodiments of the method 100, step 130 involves coating an outer surface of an object/prop with white paint that is adapted to be non-fluorescing when exposed to visible spectrum or white light (e.g., a paint designed to be without fluorescent whiteness (sometimes called non-fluorescent white paint)).

The method 100 then continues at 140 with painting or coating (or applying) objects/props for the set to form the foreground or UV layer of each light-blending surface on these objects/props. This may involve painting or applying UV or black light paint of the color set in step 120 and in the pattern also defined in step 120. This paint typically appears invisible or clear when applied over the background layer. For example, the foreground layer may be patterned to define a boundary or outline of portions of the light-blending surface so that portions border or highlight contrasts with the projected white light media/content. In other cases, though, the foreground layer may be larger and cover more of the background layer with the white light content/media used to add energy or movement to the UV portions. The foreground layer (and its UV or black light paint) allow a display designer to blend projected media into a black light environment, which had proven difficult in prior display systems, and the patterns of the UV paint (the shape, size, and location of the foreground layer of the light-blending surface (or layer stack, assembly, element, or the like may be used in place of "surface")) may be chosen and applied so as to match and/or suit projected media/content.

With this in mind, the method 100 continues at step 150 with designing and/or selecting media/content to project upon the light-blending surfaces of the objects/props in the set of the display system. The inventor has found it useful to add energy or movement to the props/objects with the media/content, and, to this end, the media/content may be a video or animation clip chosen to cause all or portions of the light-blending surfaces to appear to move and/or change over time. The media/content may be of the same size and shape as the foreground layer (as the UV-generated imagery in the set on the objects/props) or may differ such as to use the UV-generated imagery provided by the foreground layer as a border for the content/media provided by the visible light projector reflected by the background layer of the light-blending surface or element. In some embodiments, the UV paint of all or a portion of the foreground layer matches the color of the media or content projected on or near the foreground layer. This is useful in some cases because then if the visible light projector is lost/unavailable or selectively turned off by a controller the display or visual effect is still desirable or reasonable as a static image provided only via UV illumination.

The method 100 continues at 160 with projecting UV or black light with one or more UV or black light sources into the set and onto the light-blending surfaces of the props/objects. This causes the material in the foreground layers to be excited such that light emanates from these layers in the colors and with the patterns defined in step 120 and provided by painting/coating of step 140. At step 170, the method 100 involves projecting media/content (e.g., a color video or animated clip) onto the light-blending surfaces of the objects/props in the set with a visible or white light projector(s) (which may also be labeled a full spectrum projector(s)). As discussed above, the content/media provided by the light reflecting from the background layer can be used to add energy, movement, change, or the like to the surfaces of the objects/props in the set. Typically, steps 160 and 170 are performed at least partially concurrently to provide a visual display by blending a white light system with a UV light system (or blending visible light into a black light environment).

At step 180, the method 100 involves determining whether or not to halt the display. If not, the method 100 continues with performing one or both of steps 160 and 170. If yes, the method 100 may end at 190 such as by turning off the UV light source(s) and the visible light projector(s) used to perform steps 160 and 170.

Figure 2:
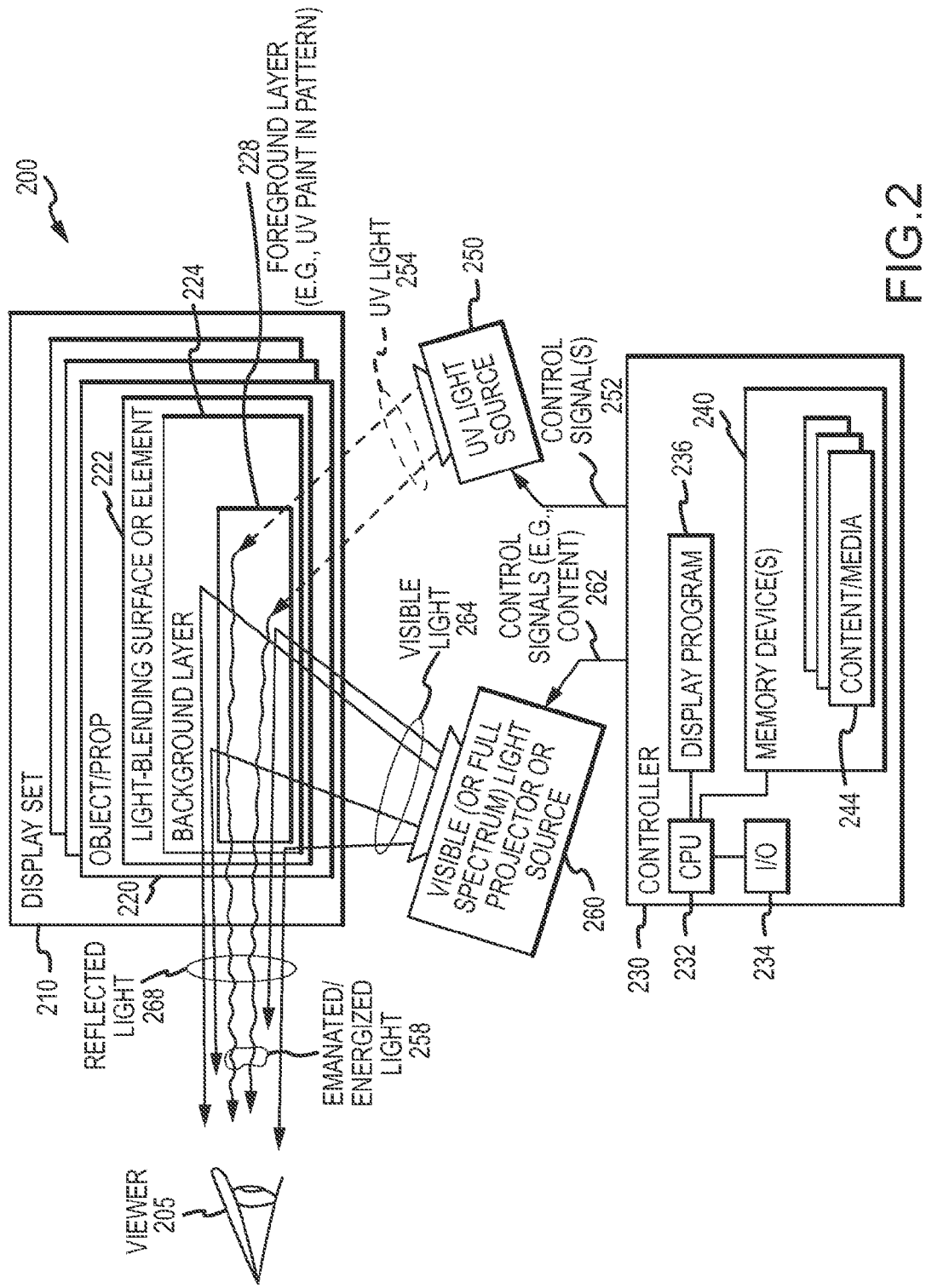
FIG. 2 is a functional block diagram of a display system of the present description showing how two light systems can be effectively blended to provide a display to a viewer.

FIG. 2 is a functional block diagram of a display system 200 of the present description showing how two light systems can be effectively blended to provide a display to a viewer 205. For example, the viewer may be a passenger in an amusement park ride vehicle (not shown) that is passing by or through the display system 200, and the viewer 205 observes a display set 210 of the system 200. The display set 210 may include a wide variety of thematic and/or artistic features include object or props 220. The objects or props 220 may be 2D features of the set 210 such as planar surfaces of walls, floors, ceilings, and the like viewable by the viewer 205. The objects or props 220 may also be 3D features of the set 210 such as flowers, foliage, trees, and the like in a natural setting, geometric shapes in another setting, props for characters and robotic elements of the set 210, and/or nearly any other useful object or prop for a thematic or entertaining display set 210.

On each of the objects/props 220, a light-blending surface (or element or layer stack 222 is formed or provided that functions to blend a display/effect provided by UV light 254 and visible light 264 (e.g., to blend visible light into a black light environment). To this end, the surface/element 222 includes a background layer 224 applied over an area of a surface of that is exposed to the light 254, 264. The background layer 224 may have a shape and size desirable for providing a projection screen on the object/prop 220 for content/media projected from a visible or full spectrum light projector 260. As discussed above, the background layer 224 may be formed by painting or coating an area of a surface of the object or prop 220 with non-fluorescing white paint.

The light-blending surface or element 222 also includes a foreground layer 228 that covers at least a portion of the background layer 224, and the foreground layer 228 is formed by painting or applying a layer of UV or black light paint (of any color) to the background layer 224. The foreground layer 228 may be applied in a pattern such as to provide a border around the edges/sides of the background layer 224, to provide a highlighting feature (e.g., paint center portions of the pattern/design of the background layer), and/or to achieve nearly any other artistic concept for imagery provided via black light 254 as shown with emanated/energized light 258 to the viewer 205.

The display system 200 further includes a controller 230 that is adapted to generate control signals 252, 262 to operate, respectively, a UV (or black) light source 250 and to operate a visible or full spectrum light projector/source 260. To this end, the controller 230 may take many forms such as a computer or computing or other electronic device. As shown, the controller 230 includes a processor 232 that manages memory or data storage devices 240, runs or executes computer code or software to provide a display program 236, and manages input and output devices (e.g., a keyboard, a mouse, a monitor/display, a touchscreen or touchpad, voice recognition software, and the like).

The I/O devices 234 of the controller 230 may be used by an operator (not shown) to initiate display program 236 (or to choose a new display program or change parameters of such a display program) and to select and/or design content/media 244 shown to be stored in memory 240 (but may also be stored in or accessible in other manners by the projector 260). For example, the content/media 244 may be selected or designed to add energy or movement on one or more of the light-blending surfaces 222 on one or more of the objects/props 220. In some cases, the content or media 244 is mapped and aligned to be projected by projector 260 substantially wholly onto portions of the background layer 224 that are free of the material of the foreground layer 228. In some cases, though, the content/media 244 may be mapped to the light-blending surface 222 on an object/prop 220 so as to be intentionally projected onto areas or portions of the foreground layer (e.g., UV paint-provided pattern) 228 such as areas abutting areas or sections of the background layer 224 that are not covered with the foreground layer 228 (not covered with any UV or black light paint). In this way, artistic creativity can be used to blend effects created by both the visible light 264 and the UV light 254 in the display set 210.

During operation of the system 200, the display program 236 may function to generate control signals 252 to operate the UV light source (or sources) 250 to provide or project UV or black light 254 onto the display set and particularly onto the light-blending surfaces 222 of the objects/props 220. As discussed above, it may be preferable to use higher quality black light fixtures to avoid also projecting visible light (e.g., bluish light), and, to this end, a UV-A fixture may be selected or one that is adapted to provide light in a relatively tight range about the spectrum or wavelength of 365 nm (e.g., a fixture providing light under 380 nm or under 370 nm). The UV light 254 strikes the foreground layer 228 and acts to energize its material to cause light 258 to be emanated and viewed by the viewer 205 in a space nearby the display set 210. Before the UV light 254 is projected (such as under visible light 264), though, the foreground layer 228 is invisible or at least not readily apparent to the viewer 205. The foreground layers 228 may be designed such that the imagery provided solely by the emanated light 258 provides a visually appealing and nearly "whole" view of surfaces of the objects/props, but this imagery is static.

To provide energy and other effects, the display program 236 also acts to generate control signals 262 to cause the visible light projector 260 to project visible light 264. This may involve retrieving predefined portions of the content/ media 244 and providing, in signals 262, this content for playback by the projector 260 with visible light 264. The content/media 244 may be mapped so as to be projected onto areas or sections of the background layers 224 such as portions not covered by the foreground layers 228 and/or onto areas/sections of the foreground layers 228 as well as nearby areas/sections of the background layers 224. The content/media 244 may include video or animation so as to cause the surfaces 222 to appear to have movement or energy or to be changing over time. The visible light 264 is reflected from the material of the background layer 224 as shown with reflected light 268, and the reflected light 268 is received and/or perceived by the eyes of the viewer 205 along with (or concurrently with) the light 258 that is emanated by the foreground layer 228 in response to being struck by the UV or black light 254 from UV source 250.

Figure 3B:
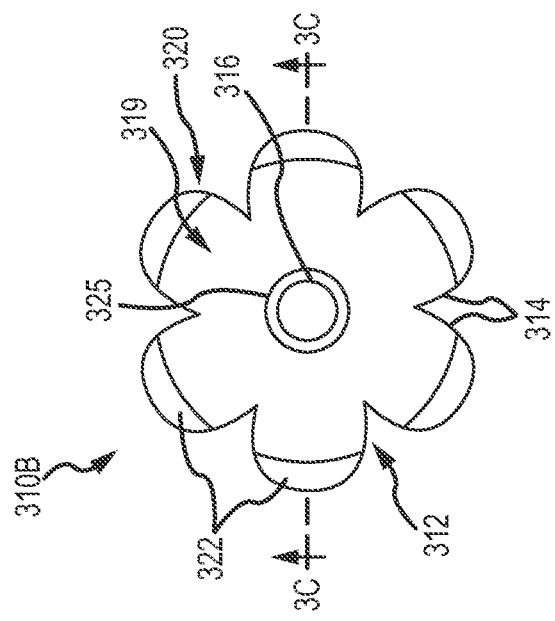
FIGS. 3A-3F illustrate images of a set object or prop (e.g., a 2D or planar flower) during fabrication stages to add a light-blending surface or element and during its use in a display system to provide a visual effect blending white light content into a black light scene.
Figure 3A:
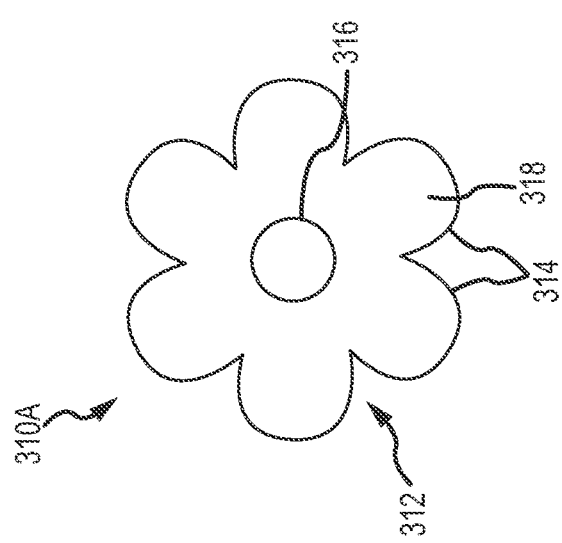

FIGS. 3A-3F illustrate images of a set object or prop (e.g., a 2D or planar flower) during fabrication stages to add a light-blending surface or element and during its use in a display system to provide a visual effect blending white light content into a black light scene. Particularly, FIG. 3A illustrates a set object or prop 310A in an initial state prior to application of a light-blending surface or element. As shown, the object 310A includes a body or substrate 312, which is planar or "2D" in this example to ease explanations but in many cases an object/prop of a set of display system will have a 3D body. The body 312 includes a plurality of arms, extensions, or petals 314 extending outward from a center area 316. Further, the body 312 includes an upper or outward-facing surface 318 that will be positioned within a set (not shown in FIG. 3A but may take the form as shown in FIG. 2 for display system 200). The material used for the body 312 is not limiting to the invention, and the body 312 may be fabricated of plastic, a textile/fabric, or other material (colored or not) and the surface 318 may be treated (e.g., painted or the like) or left untreated.

FIG. 3B illustrates the prop/object 310B in a second state after a light-blending surface or element has been formed upon or over the surface 318 of the body 312. As shown, a background layer 319 has been applied and covers the surface 318 of the body 312, and the foreground layer 319 may be provided by painting or applying a layer of paint chosen to be without or free of fluorescent whiteness (e.g., non-fluorescent white paint). Further, the light-blending surface of the object/prop 310B is provided with a foreground layer 320, which may be provided by painting or applying a thickness or layer of UV paint upon a set of areas/sections of the surface 318 or background layer 319 as shown at sections/areas 322 near the tips or ends of petals 314 and at center section/area 325. The sections/areas 322 act to define a border or boundary for other areas (non-UV painted areas) of the background layer 319, which may be used to display content (e.g., act as a projection surface or screen for video or animation provided by a white light projector). The center area/section 325 of the foreground layer 320 acts to highlight or provide contrast with UV-driven imagery on a feature of the flower object/prop 310B (e.g., to the features/components of the center of a flower in this case).

Figure 3C:
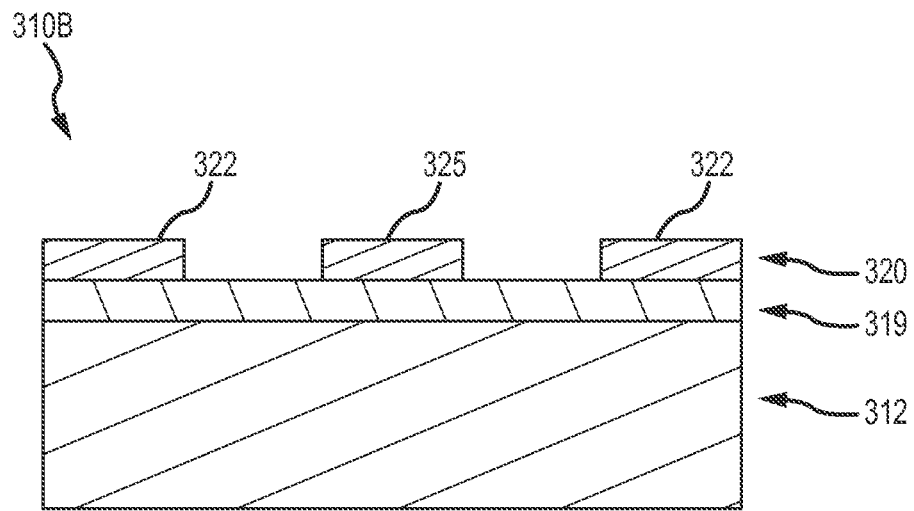

FIG. 3C provides a cross sectional view of the flower-shaped object 310B taken at line 3C-3C in FIG. 3B. As can be seen, the body 312 provides a base layer or substrate for a light-blending surface or element, which includes background layer 319 and foreground layer 320. The background layer 319 is applied over the upper surface 318 of the body 312, and, in this non-limiting example, is sized and shaped to match the surface 318 of the body 312. However, in other embodiments, the background layer 319 may only cover a subset or fraction of the surface 318 of the body 312.

FIG. 3C also illustrates that the foreground layer 320 in this example does not entirely cover the background layer 319 with sections/areas 322 being spaced apart and located toward the edges/outer boundaries of the body 312 and with section/area 325 being centrally positioned between pairs of the sections/areas 322 (and spaced apart from these sections/areas 322). In this way, there are exposed areas, sections, or portions of the background layer 319 that are not covered with the material (e.g., UV paint) of the foreground layer 320, and these exposed or uncovered areas/sections may be used as projection surfaces (reflection surfaces) for white or full spectrum light used to deliver content/media. This white light and its content/media may also, though, be delivered by projection onto all or portions of the foreground layer 320 as the white light is not absorbed by the material of the foreground layer 320 (e.g., will still be reflected by the material of the background layer 319 after it passes through the material of the foreground layer 320).

Figure 3D:
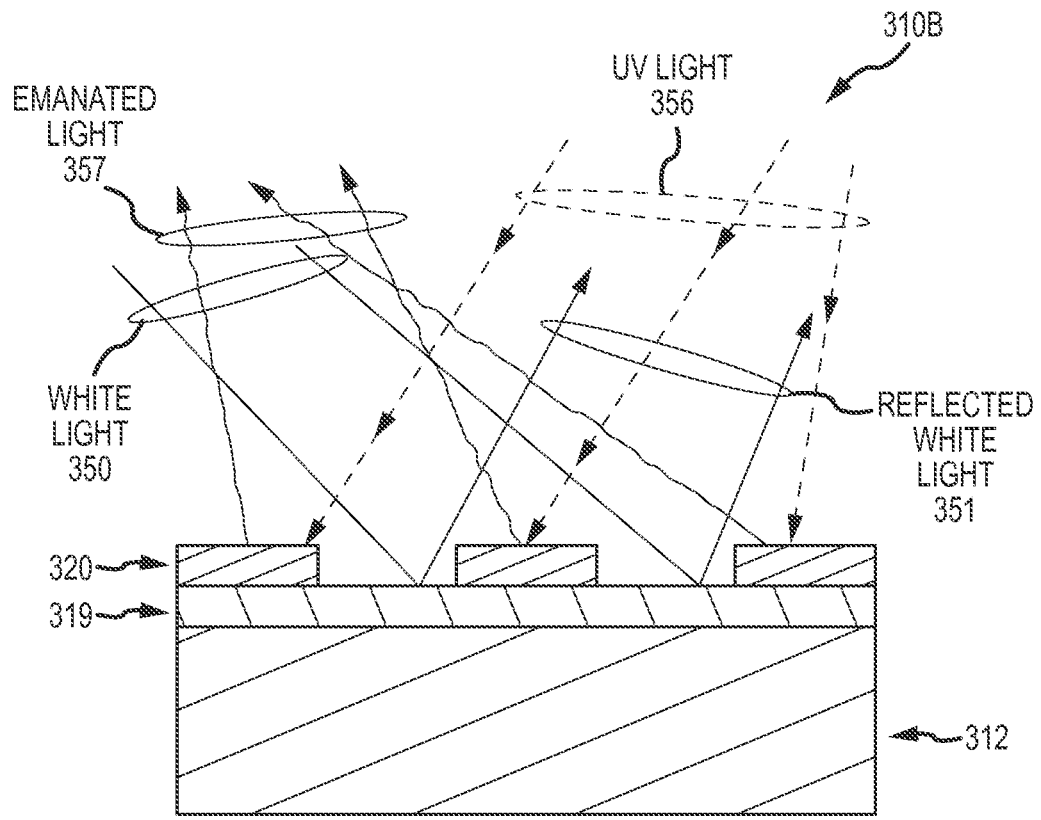

FIG. 3D illustrates the flower-shaped object of FIG. 3C during its use to blend two light systems. Particularly, FIG. 3D shows UV light 356 being directed onto the light-blending surface/element provided by the combination of the background and foreground layers 319 and 320. The uncovered areas of the background layer 319 may appear black or gray under UV light 356 (e.g., may reflect visible light included in the UV light 356 causing a grayish rather than pure black/dark appearance, which may be avoided by using a higher quality black light fixture for the source of the UV light 356). In contrast, the material of the foreground layer 320 (e.g., the UV paint) is energized such that light 357 is emitted or emanated outward from the light-blending surface at the sections/areas 322, 325 (e.g., in a border and center regions of the flower-shaped body 312).

FIG. 3D also shows white or visible light 350 being projected onto the light-blending surface on the surface 318 of the body 312. For example, a video projector may be used to project video or animation content onto the object 310B with white light 350. The background layer 319 functions to reflect a significant fraction of the received light 350 as shown at 351, which allows a human observer of the flower-shaped object 310B shown in FIG. 3D to perceive or view the content/media provided with white light 350. Concurrently, the observer/viewer also perceives the emanated light 357 from the foreground layer 320 such that a unique visual effect is achieved by blending two light systems using the light-blending surface/element of the flower-shaped object or prop 310B (which typically would be positioned within a display set of a display system).

Figure 3F:
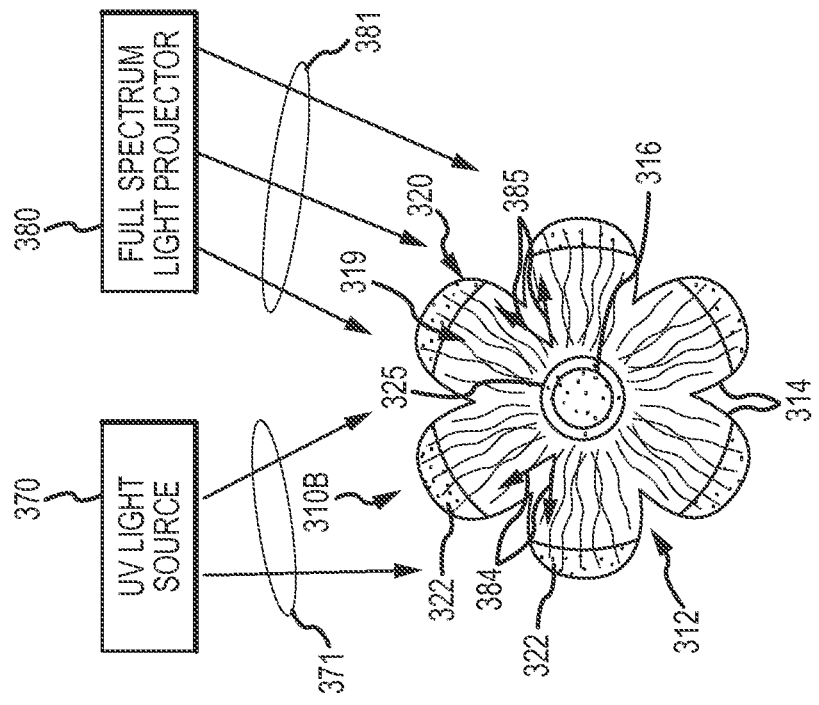
Figure 3E:
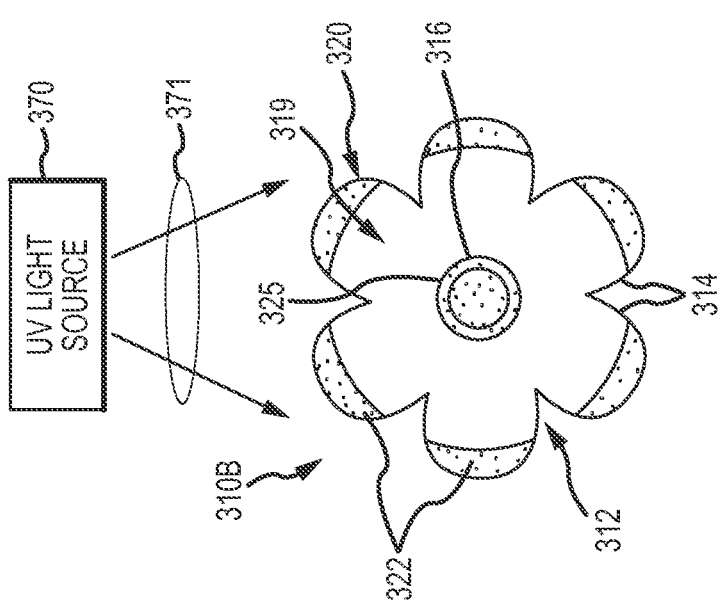

FIG. 3E shows a top view of the object/prop 310B as UV or black light 371 from a UV source 370 is projected onto the body 312. FIG. 3E is intended to represent how the flower-shaped object 310B would appear to a viewer, with the limitation that bright colors can be presented using UV light and UV-painted surfaces whereas the figure only can show images in black and white. As shown, the UV-light 371 energizes the foreground layer's sections/areas 322 and 325 causing the appearance of these sections/areas 322, 325 to change. Particularly, FIG. 3E is intended to show that sections/areas 322, 325 emanate light in a color corresponding to the UV or black light paint used to form the foreground layer 320 while areas of the background layer 319 that are not covered with such UV paint (e.g., areas of the body 312 not covered with foreground layer 320) remain unchanged in appearance or appear black (or gray if there is some visible light in UV light 371).

FIG. 3F shows the flower-shaped object 310B during another stage of operation of a display system. In particular, the UV light source 370 continues to operate to provide UV light 371 that causes the foreground layer sections 322, 325 to be illuminated. Further, though, a full spectrum light source or projector 380 is operated to project white light (content) 381 onto the light-blending surface of the body 312. This causes light to be reflected from the material of the background layer 319, which changes the appearance of these projected-upon surfaces. The white light (content) 381 may only be projected upon the areas/sections of the background layer 319 that are uncovered by the foreground layer 320 or, more typically, the light (content) 381 is projected onto these uncovered sections/areas but also onto at least some of the background layer sections 322 and/or 325. As shown, the white light (content) 381 may add energy or movement to the surface 318 of the body 312 as is shown with arrows 384, 385 such as by projecting video/animated content with a video projector 380 onto the object/prop 310B.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

The display systems and light-blending methods described herein can be implemented so as to achieve light level control for each light system (or each source of differing types of light). The systems and methods provide a display environment (or display set) in which one that can be used to produce a much wider gamut of projected illusions and theming. The projected or display environment or display set can achieve darker blacks and deeper contrast. In addition, the display system and method solves a critical problem by providing high contrast transitions at edges of complex dimensional projection surfaces such as flowers, foliage, and the like.

Precision alignment of projected media is nearly impossible in practice or in prior display environments (e.g., with moving display surfaces and other challenges) that relied upon such tight alignment. This resulted in displays with unlit edges or with blow by if the projected image was larger than the projection surface (or "missed" the surface). Either situation is usually visually apparent to an observer/viewer of the display's set/environment. However, the display systems and methods described may be implemented by painting edges of projection surfaces on objects/props with UV paint, and this acts to relax the tolerances or constraints for alignment for nearby media projection (e.g., design the media to project on surfaces/areas that are spaced apart a distance defined by this UV-painted border/edge with the understanding that some of the white light (content) will likely be projected upon the UV-painted edges/boundaries without ruining the display quality).

We claim:

1. A display system, comprising:
   an object with an outer surface;
   a first light source projecting ultraviolet (UV) light onto the outer surface;
   a second light source projecting content onto the outer surface with visible light; and
   a light-blending element on the outer surface for concurrently receiving the UV light and the visible light, wherein the light-blending element includes a background layer reflecting the visible light and a foreground layer covering at least a portion of the background layer and producing light in response to the receiving of the UV light;
   wherein the foreground layer comprises black light paint that fluoresces to produce the light in response to the receiving of the UV light;
   wherein the background layer comprises a layer of material that is non-fluorescent in response to the receiving of the UV light;
   wherein the content comprises video or animation media;
   wherein the second light source projects the content onto the outer surface with mapping of the visible light onto areas of the background layer outside of the portion covered by the foreground layer; and
   wherein the UV light comprises light in the wavelength range of 320 to 380 nanometers.

2. The display system of claim 1, wherein the layer of material in the background layer comprises non-fluorescent white paint.

3. The display system of claim 1, wherein the second light source projects the content onto the outer surface with additional mapping of the visible light onto one or more areas of the portion covered by the foreground layer.

4. The display system of claim 1, wherein the portion covered by the foreground layer includes an outer edge of the outer surface of the object.

5. The display system of claim 1, wherein the UV light comprises light with a peak wavelength of less than 380 nanometers.

* * * * *